(12) United States Patent
Rehfus et al.

(10) Patent No.: US 9,548,643 B2
(45) Date of Patent: Jan. 17, 2017

(54) LOAD CELL ON EMA HOUSING WITH TRIM RESISTORS

(71) Applicant: Goodrich Corporation, Charlotte, NC (US)

(72) Inventors: Kevin Rehfus, Troy, OH (US); Joseph E Beason, Kettering, OH (US); David Drennen, Bellbrook, OH (US); Harald Klode, Centerville, OH (US); Thomas Freshour, Troy, OH (US); Jantzen Hinton, Celina, OH (US)

(73) Assignee: Goodrich Corporation, Charlotte, NC (US)

( * ) Notice: Subject to any disclaimer, the term of this patent is extended or adjusted under 35 U.S.C. 154(b) by 586 days.

(21) Appl. No.: 14/067,602

(22) Filed: Oct. 30, 2013

(65) Prior Publication Data

US 2015/0115779 A1   Apr. 30, 2015

(51) Int. Cl.
| | | |
|---|---|---|
| H02K 11/00 | (2016.01) |
| G01L 1/22 | (2006.01) |
| B60T 13/74 | (2006.01) |
| F16D 65/18 | (2006.01) |
| G01L 1/20 | (2006.01) |
| F16D 121/24 | (2012.01) |
| F16D 125/40 | (2012.01) |

(52) U.S. Cl.
CPC .............. *H02K 11/20* (2016.01); *B60T 13/741* (2013.01); *F16D 65/18* (2013.01); *G01L 1/205* (2013.01); *G01L 1/2287* (2013.01); *F16D 2121/24* (2013.01); *F16D 2125/40* (2013.01)

(58) Field of Classification Search
CPC  B60T 13/741; F16D 2121/24; F16D 2125/40; F16D 65/18; G01L 1/205; G01L 1/2287; H02K 11/20

USPC ...................................... 310/68 B; 73/862.627
See application file for complete search history.

(56) References Cited

U.S. PATENT DOCUMENTS

| | | | |
|---|---|---|---|
| 7,834,494 B2 * | 11/2010 | Blanding ................ | B64C 13/00 310/112 |
| 2002/0073783 A1 * | 6/2002 | Wilner ...................... | A61B 3/16 73/716 |
| 2010/0071482 A1 | 3/2010 | Graumann | |
| 2012/0181965 A1 * | 7/2012 | Chamberlin ........... | H02K 11/20 318/460 |

FOREIGN PATENT DOCUMENTS

| | | | | |
|---|---|---|---|---|
| GB | 723370 | | 2/1955 | |
| GB | 723370 | A * | 2/1955 | .......... G01L 1/2287 |
| JP | 2010070788 | | 12/2010 | |
| JP | 2010270788 | A * | 12/2010 | |

OTHER PUBLICATIONS

Translation of foreign document JP 2010270788 A (Year: 2010).*
EPO; European Search Report dated Jan. 13, 2016 in EP Application No. 141908426.

* cited by examiner

*Primary Examiner* — Alex W Mok
(74) *Attorney, Agent, or Firm* — Snell & Wilmer, L.L.P.

(57) ABSTRACT

A instrumented housing for an electric motor actuator is provided. The instrumented housing may have a ribbon gage coupled to a housing of an electrical motor actuator. The ribbon gage may have one or more strain gages. The strain gages may measure the tension on the housing when the electric motor actuator exerts a load. A cover may extend over at least a portion of the housing and ribbon gage.

15 Claims, 4 Drawing Sheets

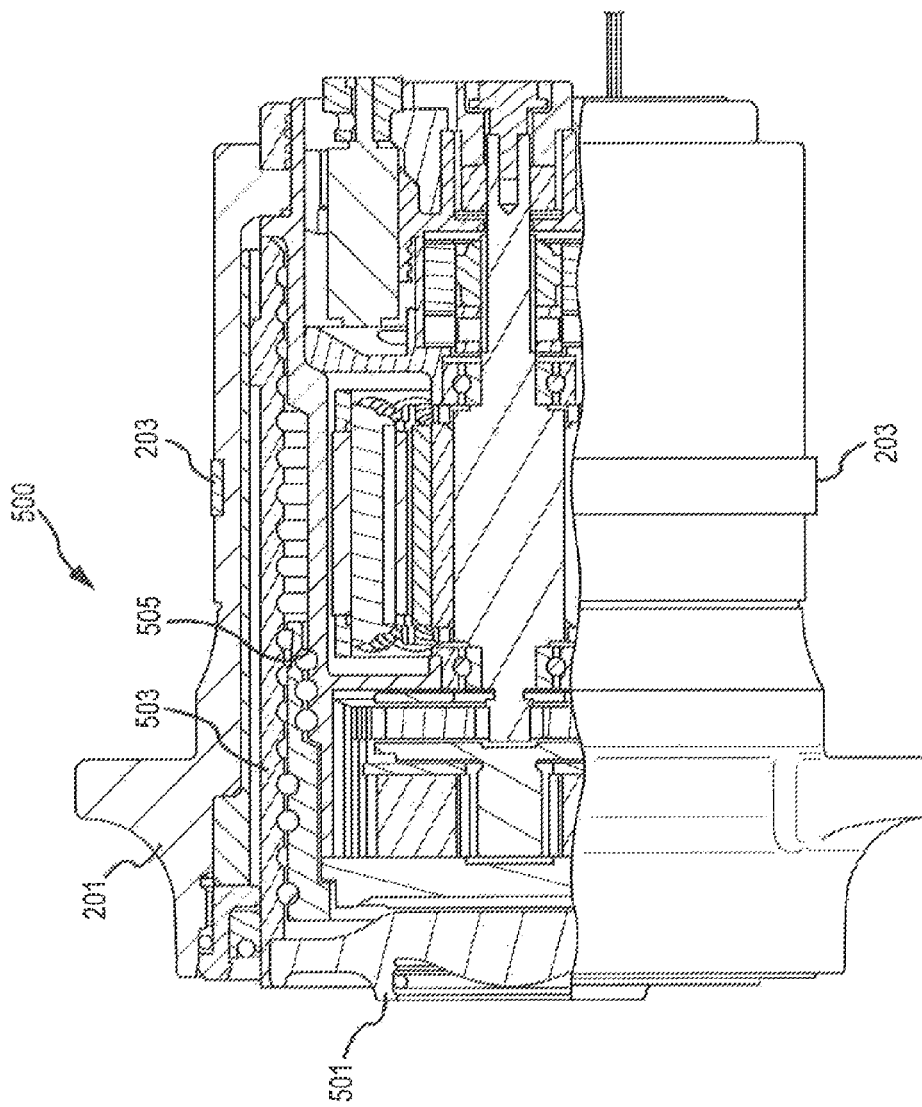

US 9,548,643 B2

LOAD CELL ON EMA HOUSING WITH TRIM RESISTORS

FIELD

The present disclosure relates to braking systems and, more specifically, to a housing for an electric motor actuator with an integrated load cell.

BACKGROUND

Typical electric motor actuators in aircraft and/or large vehicle (e.g., trains, commercial equipment, and/or the like) brake systems may employ a load cell that is installed within the actuator housing. In response to the actuator being engaged, the load cell is loaded in compression. This compressive loading may deflect and/or deform the load cell, creating inaccuracies in measurement and requiring more frequent calibration and maintenance. Moreover, once the load cell accuracy drift occurs, often the load cell trim resistors must be replaced. Furthermore, during manufacturing of such load cells, the process of calibrating the load cell is often time-consuming and requires disassembly and reassembly of the EMA/housing/load cell assembly to configure and insert the load cell in the housing.

SUMMARY

In various embodiments, an electric motor actuator may comprise an instrumented housing system. An instrumented housing system may comprise a housing, a ribbon gage, a cover, and an external interface connector.

In various embodiments, a ribbon gaffe may comprise a T-shaped substrate material. A strain gage set may be mounted on each arm of the T-shaped substrate and trim resistors may additionally be mounted. The T-shaped substrate may include a first arm and a second arm. A ribbon gage may also comprise a connector to electrically interface various components to an external interface connector.

In various embodiments, a housing may comprise a mounting flange. A ribbon gage may be mounted on the housing. In this regard, an axis of a strain gaffe set may be centered on the mounting flange at a location of desired strain.

In various embodiments, a cover may be mounted on the housing. In this regard, a cover may protect at least portions of the instrumented housing system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 6 is a cut-away view illustrating various aspects of an electric motor actuator having an instrumented housing, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should he understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may he executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact, As used herein, phrases such as "make contact with," "coupled to," "touch," "interface with" and "engage" may be used interchangeably.

In various embodiments, a brake system may comprise an electric motor actuator ("EMA"). The EMA may be coupled to or otherwise operate a pressure generating device such as, for example, a ball screw, a ram, and/or the like. In operation, the EMA may cause the pressure generating device to move and/or exert a force on other brake system structures such as, for example, a brake disk or pad to exert a stopping force on a wheel or other suitable moving structure. This stopping force may load and/or exert a corresponding force on the EMA structures such as, for example, an EMA housing. This load may also he measured to determine the amount of braking force being applied when the brake system is activated.

Figure 1:
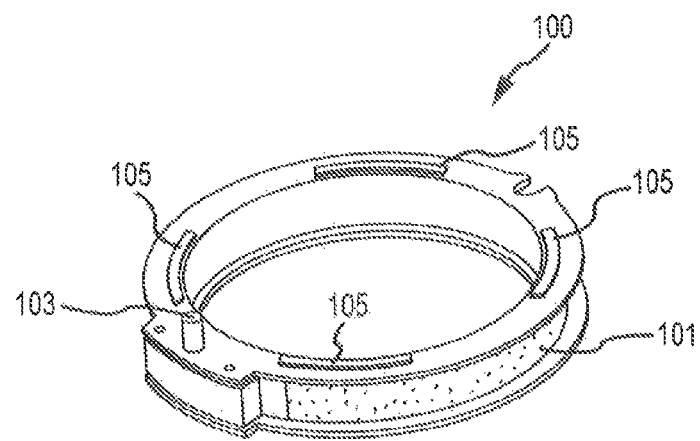
FIG. 1 illustrates a prior art load cell.

With reference to FIG. 1, a prior art load cell is illustrated. A load cell 100 is positioned in the load path of the EMA coupled to a pressure generating device so that pillars 105 are compressed by the generated pressure. Pillars 105 transfer a compressive loading to strain gages located on ribbon 101 and positioned under pillars 105. Wiring 103 leads to a separate circuit board containing trim resistors.

Figure 4:
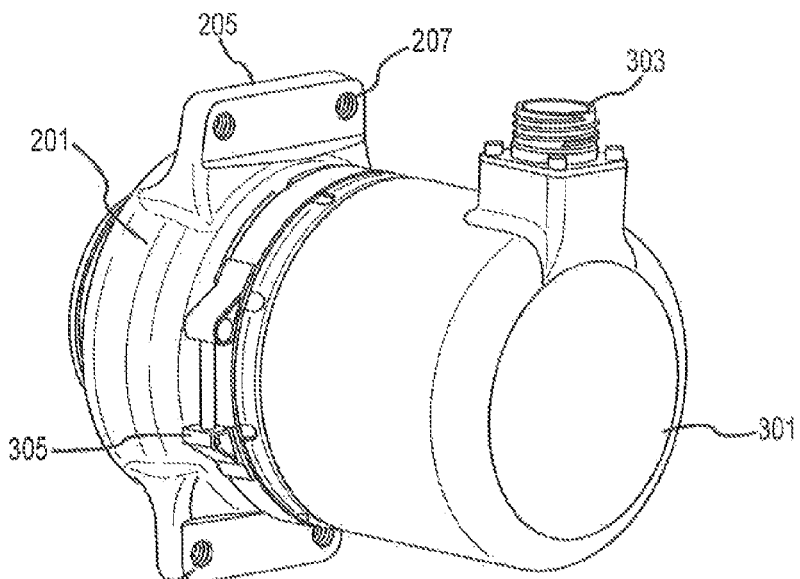
FIG. 4 illustrates an instrumented housing with a cover attached, in accordance with various embodiments.

In various embodiments, an EMA with an integrated load cell is disclosed. For example, with reference to FIG. 2, an EMA with an integrated load cell may comprise an instrumented housing system 200. The instrumented housing system 200 may comprise housing 201 and ribbon gauge 203. With reference to FIG. 4, an instrumented housing system may further comprise a cover 301 and external interface connector 303.

Figure 2:
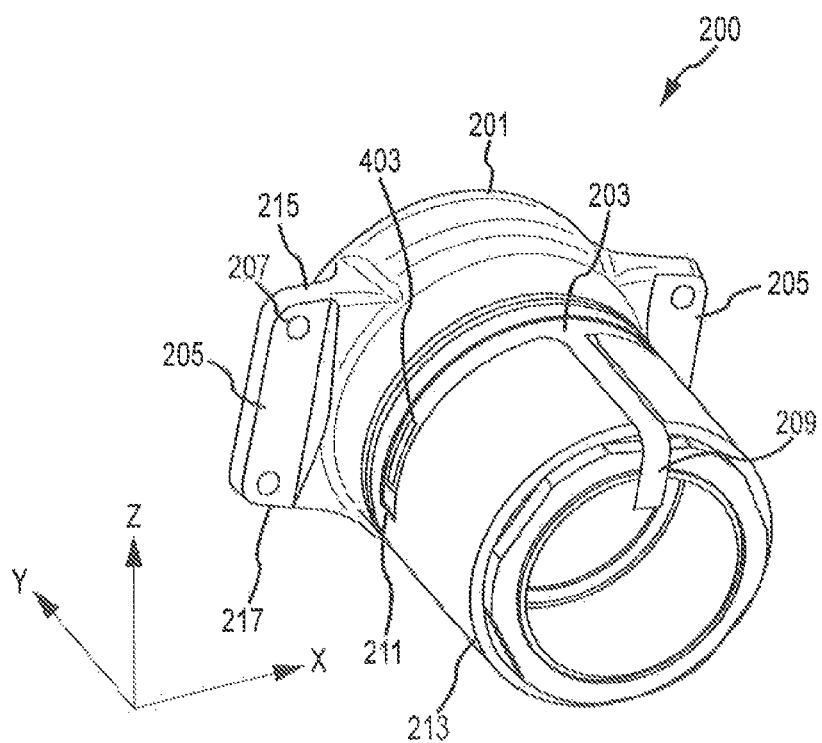
FIG. 2 illustrates an instrumented housing in accordance with various embodiments.
Figure 3:
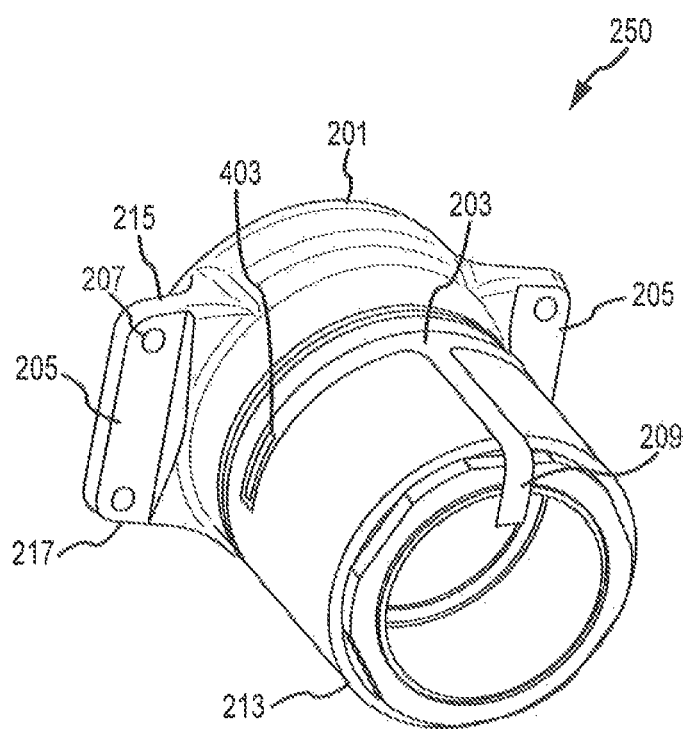
FIG. 3 illustrates an instrumented housing in accordance with various embodiments.

In various embodiments, a housing 201 comprises a groove 211 for mounting a ribbon gage 203. However, in further embodiments, for example, with reference to FIG. 3, an instrumented housing system 250 may comprise a housing 201 that does not comprise a groove, and ribbon gage 203 is mounted directly on the surface of housing 201. Moreover, in various embodiments, multiple ribbon gages are mounted on housing 201, for example, on opposite sides of the housing. With reference to FIGS. 2 and 3, housing 201 may further comprise mounting flanges 205. In various embodiments, housing 201 comprises two mounting flanges 205. Alternatively, housing 201 may comprise one mounting flange, or three mounting flanges or four mounting flanges or any number of mounting flanges adapted to hold, maintain, or otherwise couple or retain housing 201 in mechanical communication with a braking system, for example, an aircraft landing gear.

In various embodiments, mounting flange 205 comprises two attachment interfaces 207 spaced along the face of the mounting flange 205. In some embodiments, mounting flange 205 may comprise one attachment interface, or any number of attachment interfaces suitable for holding, maintaining, or otherwise coupling, or retaining mounting flange 205 in mechanical communication with a braking system, for example, an aircraft landing gear. In some embodiments, attachment interface 207 may comprise an aperture. In other embodiments, attachment interface 207 may comprise a fastener, or a threaded hole, or a captive bolt, or a captive nut any other apparatus suitable for holding, maintaining, or otherwise coupling, or retaining housing in mechanical communication with a braking system, for example, an aircraft landing gear.

Figure 5:
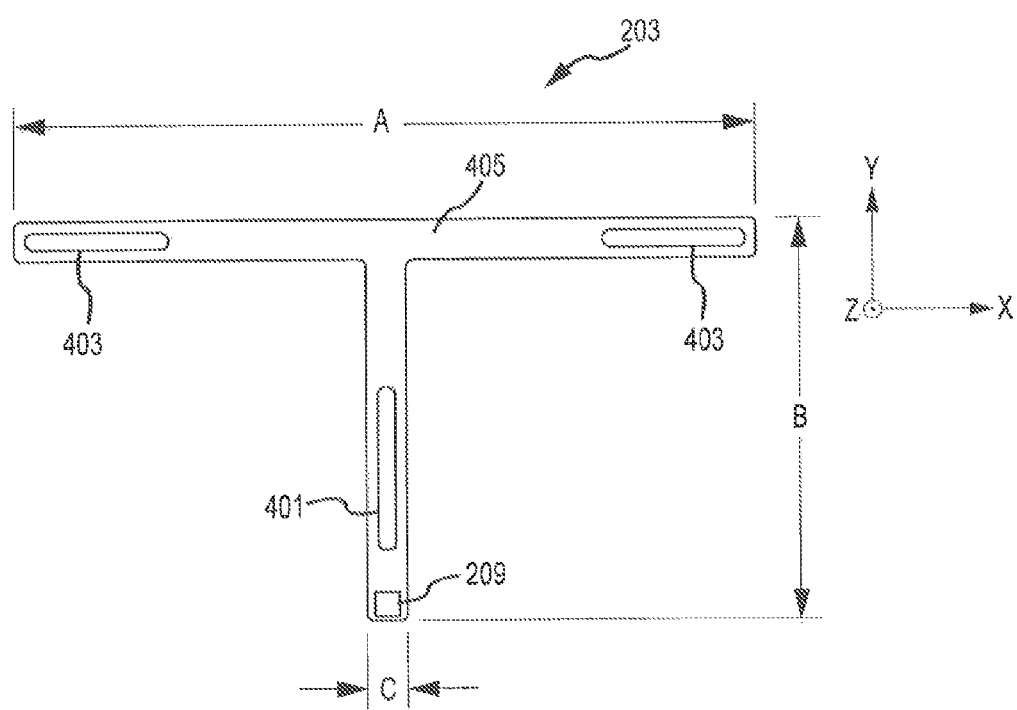
FIG. 5 illustrates various aspects of a ribbon gage, in accordance with various embodiments.

In various embodiments, with reference to FIG. 5, ribbon gage 203 may comprise a T-shaped substrate material 405. A strain gage set 403 may be mounted on one arm of the T-shaped ribbon gage 203, for example, the arm extending in the positive X axis and another strain gage set 403 may be mounted on the other arm of the T-shaped ribbon gage, for example, the arm extending in the negative X axis. In various embodiments, trim resistors 401 are mounted to the ribbon gage 203, for example, on the portion of the T extending in the Y-axis. Alternatively, ribbon gage 203 may be a long trapezoid rather than T-shaped, and may comprise a strain gage set 403 at each end, or may be any other shape adapted to place a strain gage set 403 at a desired location.

In various embodiments, strain gage set 403 may comprise one strain gage. Alternatively, strain gage set 403 may comprise two strain gages, or any number of strain gages adapted to provide accurate and precise measurement of strain.

Moreover, ribbon gage 203 may comprise various dimensions. For example, dimension A may be 5.5" though any length adapted to position the strain gage sets 403 at an area of desired strain may be utilized. In various embodiments, dimension A positions strain gage sets 403 180-degrees apart around the circumference of housing 201 and locates strain gage sets 403 at the location of desired strain, for example, at the location of maximum strain. In various embodiments, ribbon gage 203 is shaped to position strain gage sets 403 at the center of a primary axial load path. Ribbon gage 203 may further comprise a dimension B. In one embodiment, dimension B may be 3.0" though any length adapted to position connector 209 at a suitable location to enable electrical communication, for example, to enable attachment of wires, may be adopted. In various embodiments, dimension C may be 0.3" inches, though any length adapted to provide mechanical resiliency to the ribbon gage and mounting space for the various components, for example, connector 209 may be utilized.

With continuing reference to FIGS. 2 and 3, in various embodiments, ribbon gage 203 is mounted directly on the surface of housing 201 at a location along the Y axis between a mounting flange 205 and an end 213 of the housing, for example, so that a strain gage set 403 is positioned axially equidistant between the mounting flange 205 and the end 213 of the housing 201 so that the strain gage set 403 is axially equidistant between the mounting flange 205 and the end 213 of the housing 201. Furthermore, in some embodiments, ribbon gage 203 is mounted so that a strain gage set 403 is at a location along the Z axis between the upper end and lower end of the mounting flange, for example, positioned annularly equidistant between an upper end 215 and a lower end 217 of the mounting flange 205. In various embodiments, the term "axially equidistant" refers to a mid-point along the Y axis between a mounting flange 205 and the end 213 of the housing. In various embodiments, the terra "annually equidistant" refers to a mid-point along the Z axis between the upper end 215 and the lower end 217 of the mounting flange 205. Ribbon gage 203 may mounted at any position selected in conjunction with dimensions A and B of the ribbon gage, to position strain gage set 403 at the location of desired strain. In various embodiments, the location of desired strain is the location of maximum strain. In various embodiments, ribbon gage 203 is shaped to position strain gage sets 403 at the center of a primary axial load path through the housing 201, in this regard, strain gage sets 403 measure tension along the Y-axis length of housing 201.

In various embodiments, strain gage sets 403 may be wired in a Wheatstone bridge configuration with trim resistors 401. Alternatively, additional strain gages may be placed, for example, at 90 degrees from at least one strain gage set 403, for instance, at the intersection of the arms of the T-shaped ribbon gage 203, and may be wired in a Wheatstone bridge configuration wherein trim resistors 401 instead are wired in series or parallel with at least one strain gage set 403. However, any wiring configuration may be utilized which allows the strain gage sets 403 to measure tension along the length of housing 201 (e.g., along the Y-axis) and minimize the effects of bending (e.g., deflection and/or bending along the X-axis and/or Z-axis). More specifically, the deflection and associated strain measured by some strain gages may be used to adjust and/or normalize the deflection and associated strain measured by other strain gages in order to more accurately estimate the corresponding load on housing 201 (e.g., the load along the Y-axis) and filter out the effects of bending. This load may be used to create a signal that may he used for load control of the EMA.

In various embodiments, strain gage sets 403 may be installed on housing 201 in any suitable fashion. For example, a bonding film (e.g., polyimide film such as M PLY-001 KAPTON film) may be installed on housing 201 at a suitable location for strain gage set 403 installation as discussed herein. More specifically, the bonding film may he installed at each desired strain gage and/or strain gage set 403 and/or ribbon gage 203 location. The bonding film may be added for environmental and/or electrical protection.

In various embodiments, strain gage sets 403 may be operatively coupled to or in electronic communication with trim resistors 401. Trim resistors 401 may be used to calibrate the instrumented housing system.

With reference to FIGS. 2, 3, and 4, in various embodiments, strain gage sets 403 and trim resistors 401 may be in electrical communication with a wiring connector 209, Wiring connector 209 may be wired, instrumented, attached or otherwise be in electronic communication with a sensor, amplifier and/or control unit. For example, with momentary reference to FIG, 4, in various embodiments, wiring connector 209 is connected, for example, by wires, to external interface connector 303 which is then wired, instrumented, attached, or otherwise in electronic communication with a sensor, amplifier and/or control unit.

In various embodiments, the bonding film, strain gages sets 403, trim resistors 401, and/or connector 209 form a ribbon gage 203 that may be operatively coupled and/or installed on housing 201 using a suitable adhesive. The assembly may be baked for a suitable time to cure the film and adhesive, For example, in various embodiments, it is baked at 245 degrees Fahrenheit (~118° C.) for two hours.

In various embodiments, at least portions of the instrumented housing system, for example, strain gage sets 403, trim resistors 401, connector 209, and ribbon gage 203 may be covered by a coating, tape, protectant and/or the like to protect the components or portions of components from environmental exposure (e.g., temperature, contaminants, and/or the like). In this regard, at least portions of the instrumented housing, system, for example, strain gage sets 403, trim resistors 401, connector 209, and ribbon gage 203 may be covered by a tape such as, for example, a high temperature tape. At least portions of the instrumented housing system, for example, strain gage sets 403, trim resistors 401, connector 209, and ribbon gage 203 may also be coated and/or sealed with a suitable sealer such as silicon.

With momentary reference to FIG. 4, in various embodiments, a cover 301 may be joined to a collar 305 and mounted on housing 201 to protect at least portions of the instrumented housing system, for example strain gage sets 403, trim resistors 401, connector 209, and ribbon gage 203.

Prior load cells designed for use with the EMAs attempted to measure load in compression. These load cells were typically installed as separate components inside the actuator housing at the bottom end of the housing. These prior load cells may be susceptible to calibration and zero shifts of load measurements because the load path of the prior load cells varied due to deflection, edge loading, and movement of the load cell within the actuator housing. Moreover, the prior load cells were typically loaded in compression, which can make strain gage measurements less accurate.

With reference to FIGS. 2 and 6, EMA 500 may include an instrumented housing and, more specifically, housing 201 and ribbon gage 203 installed outside of the housing 201 to create an instrumented housing that becomes the load cell. The load through the instrumented housing is measured in tension which negates the effects of deflection, edge loading, and movement that may be present in prior load cells. In various embodiments, the load path may proceed through ball screw puck 501 into ball screw 503 and thrust bearing assembly 505 and into housing 201. Housing 201 is loaded in tension as the load path continues into mounting flanges 205. In this manner, the load may be measured in tension by the strain gage sets 403 of ribbon gage 203.

Now, having described various components of instrumented housing systems, an instrumented housing system may he manufactured from various materials. In various embodiments, an instrumented housing system may comprise aluminum. However, in further embodiments, an instrumented housing system may comprise other metals, such as titanium, tungsten or stainless steel, though it may further comprise numerous other materials configured to provide support, such as, for example, composite, ceramic, fibers, alloy, glass, binder, epoxy, polyester, acrylic, or any material or combination of materials having a desired strength or elasticity sufficient to maintain accurate and precise load measurement and resiliency during use. In various embodiments, various portions of instrumented housing systems as disclosed herein are made of different materials or combinations of materials, and/or may comprise coatings.

In various embodiments, instrumented housing systems may comprise multiple materials, or any material configuration suitable to enhance or reinforce the resiliency and/or support of the system when subjected to wear in an aircraft operating environment or to satisfy other desired electromagnetic, chemical, physical, or biological properties. For example, in various embodiments, housing 201 is made of aluminum or an aluminum alloy suitable to enhance the gain of the strain gages by facilitating linearity of behavior under tension and to enhance the accuracy and precision of the strain gages by minimizing hysteresis.

In various embodiments, the present disclosure provides an instrumented housing with weight and space savings. Moreover, the instrumented housing significantly reduces manufacturing and/or instrumentation time. For example, the instrumented housing once equipped with the ribbon gage can be calibrated by subjection to a controlled load while the output is measured, followed by the selection of trim resistors. In various embodiments, the systems described herein may provide overall cost savings as compared to prior load cell systems, which, for example, may require more frequent recalibration and additional assembly/disassembly cycles as well as manufacture of an additional precise body.

In various embodiments, while the integral housing load cells described herein have been described in the context of aircraft applications, one will appreciate in light of the present disclosure, that the integral housing load cells described herein may be used on various other vehicles such as, for example, trains. Moreover, the integral housing load cells described herein may be employed with any suitable electric motor actuator in any installation.

Thus, in various embodiments, the integral housing load cells described herein provide a cost effective and reliable electric motor actuator.

In various embodiments, the integral housing load cells described herein provide improved reliability as compared to prior load cell systems because the parts are not subject to movements over time which could affect load cell measurements and because the integrated nature of the strain gages permits the EMA to be disassembled and reassembled without needing to be retrimmed. Furthermore, the instrumented housings described herein provide improved performance because actuation loads are evenly distributed across the thrust bearing of the EMA because there are no load cell pillars in the load path.

Benefits, other advantages, and solutions to problems have been described herein with regard to specific, embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more," Moreover, where a phrase similar to "at least one of A, B, C" is used in the claims, it is intended that the phrase he interpreted to mean that A alone may he present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to he dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An instrumented housing for an electric motor actuator comprising:
   a housing; and
   a first ribbon gage installed on an exterior surface of the housing, wherein the first ribbon gage comprises:
      a T-shaped substrate material having a first arm and a second arm, and
      a first strain gage set installed on the first arm of the T-shaped substrate material,
   wherein the first strain gage set is configured to measure tension along an axial load path of the housing.

2. The instrumented housing of claim 1, wherein the first ribbon gage further comprises:
   a second strain gage set installed on the second arm of the T-shaped substrate material; and
   a trim resistor.

3. The instrumented housing of claim 2, wherein the housing comprises a substantially cylindrical body portion and a mounting flange.

4. The instrumented housing of claim 3, wherein the first ribbon gage is installed in a location wherein at least one of the first strain gage set and the second strain gage set of the first ribbon gage is positioned on the axial load path.

5. The instrumented housing of claim 2, wherein the first ribbon gage is installed in a location on the housing wherein at least one of the first strain gage set and the second strain gage set is installed annularly equidistant between a first end and a second end of a mounting flange and is installed axially equidistant between the mounting flange and an end of the housing.

6. The instrumented housing of claim 1, wherein the first strain gage set comprises a first strain gage and a second strain gage.

7. The instrumented housing of claim 1 further comprising a second ribbon gage.

8. The instrumented housing of claim 1, further comprising a cover installable on the housing and coupled to the housing with a collar.

9. The instrumented housing of claim 1, wherein the housing comprises at least one of aluminum and aluminum alloy.

10. A strain gage system, comprising:
    a housing comprising a first mounting flange and a second mounting flange;
    a ribbon gage installed on the housing wherein the ribbon gage comprises:
       a T-shaped substrate,
       a first strain gage set,
       a second strain gage set, and
       a trim resistor;
    a connector in electronic communication with the first strain gage set, the second strain gage set and the trim resistor; and
    wherein a portion of the ribbon gage is coupled to the housing at a location wherein the first strain gage set is installed annularly equidistant between a first end and a second end of the first mounting flange,
    wherein a portion of the ribbon gage is coupled to the housing at a location wherein the first strain gage set is installed axially equidistant between the first mounting flange and an end of the housing,
    wherein a portion of the ribbon gage is coupled to the housing at a location wherein the second strain gage set is installed annularly equidistant between a first end and a second end of the second mounting flange, and
    wherein a portion of the ribbon gage is coupled to the housing at a location wherein the second strain gage set is installed axially equidistant between the second mounting flange and an end of the housing.

11. The strain gage system according to claim 10, further comprising a cover installable on the housing and coupled to the housing with a collar.

12. The strain gage system according to claim 10, wherein the housing comprises at least one of aluminum and aluminum alloy.

13. The strain gage system of claim 10, wherein the ribbon gage is installable on the housing by adhesive.

14. The strain gage system of claim 10, wherein the housing further comprises a groove wherein the ribbon gage is installed on the housing in the groove.

15. The strain gage system of claim 10, wherein at least one of the first strain gage set and the second strain gage set measure tension along a load path of the housing.

* * * * *